2,921,088
ALCOHOLYSIS OF AROMATIC NITRILES WITH POLYHYDRIC ALCOHOLS

Edward James Gasson and David James Hadley, Epsom Downs, England, assignors to The Distillers Company Limited, Edinburgh, Scotland, a British company No Drawing. Application November 8, 1956
Serial No. 621,024

Claims priority, application Great Britain
November 25, 1955

12 Claims. (Cl. 260—475)

The present invention relates to the production of esters and in particular to the production of esters of organic carboxylic acids from the corresponding nitriles.

The production of esters by the alcoholysis of nitriles in the presence of a mineral acid is known. In general the nitrile is reacted with an aqueous alcohol in the presence of large amounts of sulphuric acid. In this reaction the nitrogen of the nitrile is converted to the relatively valueless ammonium sulphate, the separation of which from the sulphuric acid is a difficult and costly process. Furthermore the reaction necessitates the use of expensive acid-resisting equipment and as a result the manufacture of esters by this method is commercially limited.

It is also known that nitriles can be reacted with alcoholic alkali, for instance alcoholic potash, to form the salt of the acid corresponding to the nitrile starting material.

It is an object of the present invention to provide a process for the conversion of nitriles to esters in a single step in non-acidic medium.

According to the present invention, the process for the production of esters of organic carboxylic acids from their corresponding nitriles comprises reacting an organic nitrile, preferably an aromatic nitrile, with a polyhydric alcohol in the non-acidic liquid phase, and preferably in the presence of water, at a temperature at which ammonia is evolved from the liquid reaction medium, and removing the formed ammonia from the reaction zone.

The starting materials for the process comprise organic nitriles and in particular aromatic nitriles such as benzonitrile, terephthalonitrile, isophthalonitrile, m- and p-tolunitriles, β-naphthalonitrile, m- and p-nitrobenzonitriles, m- and p-chlorobenzonitriles, α-, β- and gamma-cyanopyridines, α- and β-furonitriles, fumaronitrile, and adiponitrile. Particularly good results are obtained with benzonitrile, isophthalonitrile and terephthalonitrile. The alcohols which may be used include dihydric alcohols such as ethylene glycol, propylene glycols and butylene glycols, and trihydric alcohols such as glycerol.

The process may be carried out in a continuous or preferably a batchwise manner. The reaction, which proceeds according to equations of the following type:

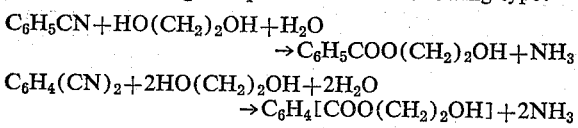

$$C_6H_5CN + HO(CH_2)_2OH + H_2O$$
$$\rightarrow C_6H_5COO(CH_2)_2OH + NH_3$$

$$C_6H_4(CN)_2 + 2HO(CH_2)_2OH + 2H_2O$$
$$\rightarrow C_6H_4[COO(CH_2)_2OH] + 2NH_3$$

takes place over a moderately wide range of proportions of the starting materials. In general it is desirable to have an excess of the alcohol present to maintain the reaction at the optimum rate, for instance about 5 to 10 moles of alcohol per mole of cyanide radical present. Although the equation requires the presence of 1 mole of water per mole of cyanide radical the reaction will in fact take place in the absence of added water, the elements of water in this case being derived by dehydration of some of the alcohol present. It is, however, preferred to promote the formation of normal esters, rather than ether-esters, by ensuring the presence of at least the theoretical amount of water. In general it can be said that it is desirable to add water only in slight excess of the theoretical requirements, and in any case the concentration of water in the total reaction mixture should not amount to more than 20% by volume so as to avoid reducing the rate of reaction. If superatmospheric pressures are being employed the presence of more water may be tolerated than would otherwise be possible.

It has further been discovered that the concentration of water in the reaction mixture is critical, if the optimum rates of reaction are to be obtained. Accordingly, in a preferred embodiment of the invention, the water is added continuously or intermittently to the reaction mixture so as to maintain the level of free water at between about 10 and 50% of the total water required for complete reaction of the nitrile present in the initial reaction mixture. Where the reaction is carried out continuously the reactants are charged to one end of the reactor and the products are continuously withdrawn from the other end, while the water is continuously or intermittently fed in at a series of positions down the length of the reactor, so that the level of free water in any given volume of the reaction mixture is maintained at between about 10 and 50% of the total water required for the complete reaction of the nitrile intially present in that volume of the reaction mixture. The maintenance of the level of free water in the reaction mixture between the limits specified above is conveniently carried out by adding the water continuously or semi-continuously to the reaction mixture at a rate correlated with the rate of evolution of the ammonia. During the initial part of the reaction period, when the reaction rate is at a high level, the level of water is desirably maintained at the upper end of the range specified, while during the later part of the reaction period the level is allowed to drop to a figure near the lower limit of the range specified. For instance, at the start of the reaction it is preferred to have a water level of at least 33% of that necessary for complete reaction of the nitrile present, while as the reaction proceeds the amount of free water is reduced to a level of about 10% at the termination of the reaction.

The water may be added to the reaction mixture in the liquid state, or preferably in the gaseous state. In order to achieve a sufficiently high conversion of the nitrile to esters it is preferred to evaporate part or the whole of the formed free ammonia whilst the reaction proceeds. This may be done periodically or continuously, by keeping the reaction mixture boiling and/or passing an inert gas stream through the reaction mixture to entrain the ammonia. In a preferred embodiment, an inert gas, e.g. nitrogen gas, preferably saturated with water at the same temperature as the cooled vapours evolved from the reaction mixture is passed through the reaction mixture. This prevents accumulation or depletion except by chemical reaction of the water in the reaction system. On the other hand it has been found that the rate of the reaction is increased by the presence of ammonia in the reaction mixture, and it is a preferred feature to allow the ammonia to build up temporarily in the initial stages and only to remove it during the later stages of the reaction.

The reaction is carried out at a temperature at which ammonia is evolved from the liquid reaction medium, if necessary under pressures other than atmospheric pressure. In general the lower temperature limit of the reaction at which ammonia is evolved will be of the order of 100° C. but at such temperatures the reaction will only take place slowly. Technically interesting rates of reaction are obtained at about 150° C. or above. The upper temperature limit of the reaction depends on the stability of the components of the reaction medium, and is generally not higher than 280° C.

The reaction is carried out in the absence of acid catalysts, and proceeds satisfactorily in the absence of any added catalyst. It can, however, if desired, be promoted by the presence of basic catalysts. Preferred catalysts include the hydroxides of the alkali and alkaline earth metals, or their salts with weak inorganic or organic acids, such as the carbonates, bicarbonates, acetates and the like, organic bases such as pyridine, and ammonia. It is desirable to use such catalysts only in very small catalytic quantities, for instance up to molar proportions of about 1/50 based on the cyanide groups present, in order not to affect the yield of the desired ester by converting too much of the nitrile to the undesired salts of the corresponding carboxylic acid, and to obviate the necessity of separating solid catalyst material from the ester product.

It has been found that the reaction slows down considerably when about 70–90% of the nitrile has been converted. It is therefore a preferred feature of the invention to carry out the reaction only to a limited conversion, remove the formed ester from the cooled reaction mixture and return the other components, either separately or combined, for a new cycle of operation. In cases where the vapour pressures of the components are suitable, it is also possible to recover the ester by evaporation whilst the reaction proceeds, separate it from the distillate and return the other components to the reaction mixture.

The ester product of the reaction can be recovered by the conventional methods, for instance fractionation or crystallisation methods. If the reaction is stopped before it has reached completion, the fractionation is carefully carried out below reaction temperature and/or after neutralisation of any catalyst used. In the case of the preparation of the bis-glycol ester of terephthalic acid it has been found that the ester can be precipitated as a crystalline mass from the cooled reaction mixture, and it is a preferred feature of the invention to return the mother liquors for a new cycle of reaction.

The following examples are given further to illustrate the process of the invention. In the examples all parts are by weight.

EXAMPLE 1

Benzonitrile (20.6 parts by weight), ethylene glycol (45.3 parts by weight) and magnesia (0.16 part by weight) were heated under reflux by means of an oil bath at 180° C. whilst a slow stream of dry nitrogen was passed through the mixture. The reaction was stopped by cooling when 63.4% of the ammonia (i.e. 2.16 parts by weight) had been evolved, and the product was fractionated at 0.5 mm. Hg pressure after the magnesia had been filtered off. By cooling the fraction boiling at 92–102° C. a crystalline mass was obtained which by equivalent weight and M.P. (42° C.) was identified as hydroxyethyl benzoate. The higher fractions contained di(1:2-benzoyloxy) ethane, identified by M.P. (73° C.) and equivalent weight, as well as esters of higher glycols. The total yield of the esters of ethylene glycol was 51% based on the benzonitrile reacted.

EXAMPLE 2

Benzonitrile (20.6 parts by weight), ethylene glycol (93.0 parts by weight), water (5.4 parts by weight) and magnesia (0.16 part by weight) were heated under reflux at 180° C. whilst a stream of wet nitrogen was passed through the mixture. The reaction mixture was cooled and the nitrogen stream stopped when 2.18 parts by weight of ammonia had been removed from the system. The product was distilled at reduced pressure to give in the earlier fractions, water, glycol and unreacted benzonitrile followed by hydroxy-ethyl benzoate in 70% yield, based on the benzonitrile reacted, as a fraction boiling at 100 to 104° at 0.5 mm. Hg. The distillation residue contained di-(1:2-benzoyloxy)-ethane in 7% yield calculated on the benzonitrile consumed.

EXAMPLE 3

A mixture of terephthalonitrile (20 parts by weight) water (6 parts by weight), ethylene glycol (97.7 parts by weight) and as catalyst sodium methoxide (0.2 part by weight) was heated at 180–190° C., whilst a slow stream of wet nitrogen was passed through it. The course of the reaction was followed by means of the liberated ammonia. 80% of the theoretical amount of ammonia was evolved within 5 hours and the reaction was continued until 95% was evolved. On cooling the mix a while solid was deposited which was filtered off and washed with a small quantity of water: this amounted to 30.4 parts by weight. The glycol was removed from the filtrate by distillation at 0.5 mm. Hg pressure leaving a further 6.5 parts by weight of solid. The two quantities of solids were combined and received another wash with cold water, and the product, after being dried, melted at 100–104° C., and had a saponification value of 124. When recrystallised from water it had a melting point of 109–110° C. It was converted to a fibre-forming polymer by being heated at 275° C. and 0.3 mm. Hg pressure for 2 hours.

The process was repeated except that no catalyst was used initially. After 5 hours only 51.5% of the ammonia was evolved, indicating that the reaction was proceeding at a slower rate than when catalyst was present.

EXAMPLE 4

A mixture of terephthalonitrile (50 parts), water (5 parts), glycol (246 parts) and as catalyst sodium methoxide (0.2 part) was heated under reflux, whilst a stream of nitrogen saturated with water vapour at the temperatures of the cooling water entering the reflux condenser was passed through the mixture. The nitrogen together with ammonia liberated by the reaction left the system by way of the reflux condenser and the ammonia was continuously collected and measured. As the reaction proceeded five equal portions of water, each of 2 parts, were added at 0.6, 1.0, 1.45, 2.00 and 4.00 hours measured from the commencement of the reaction. The reaction was terminated at five hours when the ammonia evolved was equivalent to 76.9% of the original terephthalonitrile. On cooling the mix a white solid was deposited which was filtered off and washed with a small quantity of water. The product, di(2-hydroxy-ethyl) terephthalate, after being dried, melted at 100–104° C. and had a saponification value of 124 (calculated 127). When recrystallised from water it had a melting point of 109° C. It was converted to a fibre-forming polymer of melting point 262° C. by heating at 275° C. and 0.3 mm. mercury pressure for 3 hours.

By way of comparison with the above example, when the process was repeated, adding the total 15 parts of water at the commencement of the reaction the rate of reaction was drastically reduced. After 5 hours the ammonia evolved was equivalent only to 33% of the original terephthalonitrile, and it was necessary to continue the reaction for 23 hours to obtain ammonia equivalent to 72.5% of the original terephthalonitrile.

EXAMPLE 5

A mixture of isophthalonitrile (10 parts), water (0.5 part), ethylene glycol (49 parts), and as catalyst sodium methoxide (0.2 part) was heated under reflux, whilst a stream of nitrogen saturated with water vapour at the temperature of the cooling water entering the reflux condenser was passed through the mixture. The nitrogen together with ammonia liberated by the reaction left the system by way of the reflux condenser and the ammonia was continuously collected and measured. As the reaction proceeded five equal portions of water, each of 0.5 part, were added at 0.4, 1.0, 1.5, 2.5 and 3.5 hours respectively measured from the commencement of the reaction. The reaction was terminated at 6 hours when the ammonia evolved was equivalent to 82.0% of the original isophthalonitrile. The excess glycol was removed from the solution by distillation leaving a white solid, which was recrystallised from acetone/petroleum ether to give di-(2-hydroxyethyl) isophthalate, which melted at 142° C. and had a saponification value of 126.

By way of comparison when the process was repeated, adding the total 3.0 parts of water at the commencement of the reaction the rate of reaction was drastically reduced. After six hours the ammonia evolved was equivalent only to 34.4% of the original isophthalonitrile. The progress of the reaction is shown in both cases in detail in the following table.

Table

| Time (Hours) | Run 1 (Intermittent Addition of water) | Run 2 (Addition of water at start of reaction only) |
| --- | --- | --- |
| 1.0 | 34.9 | 19.2 |
| 2.0 | 56.5 | 23.3 |
| 3.0 | 72.1 | 25.4 |
| 4.0 | 78.5 | 28.5 |
| 5.0 | 81.2 | 31.1 |
| 6.0 | 82.0 | 34.4 |

EXAMPLE 6

A mixture of terephthalonitrile (10 parts), water (3 parts), glycerol (72 parts) and sodium methoxide (0.1 part) was heated under reflux, whilst a stream of nitrogen saturated with water vapour at the temperature of the cooling water entering the reflux condenser was passed through the mixture. The nitrogen together with ammonia liberated by the reaction left the system by way of the reflux condenser and the ammonia was continuously collected and measured.

After one hour the ammonia evolved was equivalent to 57% of the original terephthalonitrile, and after 3.3 hours the ammonia evolved was equivalent to 82% of the original terephthalonitrile. The glycerol esters of terephthalonitrile could be recovered from the resulting solution in glycerol by distillation.

EXAMPLE 7

A mixture of fumaronitrile (2 parts), water (1 part) and ethylene glycol (16 parts) was heated under reflux in the presence of 0.1 part of sodium methoxide catalyst as described in Example 6.

The reaction was terminated at 7.5 hours when the ammonia evolved was equivalent to 31% of the original fumaronitrile. Di-(2-hydroxyethyl) fumarate could be recovered from the resulting solution in glycol by distillation.

EXAMPLE 8

A mixture of adiponitrile (5.4 parts), water (1.8 parts) and glycol (31 parts) was heated under reflux in the presence of 0.1 part of sodium methoxide catalyst as described in Example 6. After 6.5 hours the ammonia evolved was equivalent to 17.5% of the original adiponitrile, and after 24 hours the ammonia evolved was equivalent to 43% of the original adiponitrile. Di-(2-hydroxyethyl) adipate could be recovered from the resulting solution in glycol by distillation.

The esters produced by the process of the present invention are valuable chemical intermediates in the preparation of useful polymers, in the case of esters prepared from dinitriles, and are also valuable solvents and plasticisers.

W claim:

1. A one-step process for the production of esters of aromatic carboxylic acids from their corresponding nitriles which comprises heating an aromatic nitrile and a lower aliphatic polyhydric alcohol in the non-acidic liquid phase at a temperature in the range of 150° to 280° C., removing the formed ammonia from the reaction zone, and recovering the esters thus produced.

2. The process as claimed in claim 1 wherein the aromatic nitrile is selected from the group consisting of benzonitrile, terephthalonitrile, isophthalonitrile, meta-tolunitrile, para-tolunitrile, β-naphthonitrile, meta-nitrobenzonitrile, para-nitrobenzonitrile, meta-chlorobenzonitrile and para-chlorobenzonitrile.

3. The process as claimed in claim 1 wherein the alcohol is selected from the group consisting of dihydric and trihydric alcohols.

4. The process as claimed in claim 3 wherein the dihydric alcohol is selected from the group consisting of ethylene glycol, propylene glycol and butylene glycol.

5. The process as claimed in claim 3 wherein the trihydric alcohol is glycerol.

6. The process as claimed in claim 1 wherein the molar proportion of alcohol to aromatic nitrile is between 5:1 and 10:1.

7. The process as claimed in claim 1 wherein the reaction is carried out in the presence of added water.

8. The process as claimed in claim 7 wherein the water is added progressively to the reactants so as to maintain a proportion of free water at between about 10 and 50% of the total water required for complete reaction of the initial nitrile present.

9. The process as claimed in claim 8 wherein the proportion of water is maintained at the upper end of said range at the beginning of the reaction, and is allowed to fall to a figure near the lower limit of said range towards the end of the reaction.

10. The process as claimed in claim 1 wherein the reaction is carried out in the presence of a basic catalyst.

11. The process as claimed in claim 10 wherein the catalyst is selected from the group consisting of the hydroxides of the alkali and alkaline earth metals, salts of the hydroxides of the alkali and alkaline earth metals with weak inorganic and organic acids, pyridine, and ammonia.

12. The process as claimed in claim 1 wherein the organic nitrile is terephthalonitrile, the polyhydric alcohol is ethylene glycol, the reaction product is cooled to precipitate the bis-glycol ester of terephthalic acid as a crystalline mass, and wherein the separated mother liquors are recycled to the reaction.

References Cited in the file of this patent

UNITED STATES PATENTS 2,195,076    Braun et al.    Mar. 26, 1940
2,809,208    Miller et al.    Oct. 8, 1957

FOREIGN PATENTS 592,106    Great Britain    Sept. 8, 1947

OTHER REFERENCES

Hickinbottom: "Reactions of Org. Compounds," p. 281 (1948).

Groggins: "Unit Processes in Organic Synthesis," pp. 599–600, McGraw-Hill, 1952.

Groggins: Unit Processes in Org. Syn.," pp. 620–1 (1952).